US012569388B2

(12) United States Patent
Jaeger et al.

(10) Patent No.: US 12,569,388 B2
(45) Date of Patent: Mar. 10, 2026

(54) ADJUSTABLE TABLE AND RELATED METHODS

(71) Applicants: Universal Tractioning Systems, Inc., Las Vegas, NV (US); Deed Harrison, LLC, Eagle, ID (US)

(72) Inventors: Jason Orion Jaeger, Las Vegas, NV (US); Deed Eric Harrison, Eagle, ID (US)

(73) Assignees: Universal Tractioning Systems, Inc., Las Vegas, NV (US); Deed Harrison, LLC, Eagle, ID (US)

( * ) Notice: Subject to any disclaimer, the term of this patent is extended or adjusted under 35 U.S.C. 154(b) by 441 days.

(21) Appl. No.: 17/300,884

(22) Filed: Dec. 6, 2021

(65) Prior Publication Data

US 2022/0241127 A1 Aug. 4, 2022

Related U.S. Application Data

(60) Provisional application No. 63/205,462, filed on Dec. 11, 2020.

(51) Int. Cl.
*A61G 13/00* (2006.01)

(52) U.S. Cl.
CPC .................................. *A61G 13/009* (2013.01)

(58) Field of Classification Search
CPC ...... A61G 13/00; A61G 13/009; A61G 13/02; A61G 13/04; A61G 13/08; A61H 1/00; A61H 1/008; A61H 1/0222; A61H 9/00; A61H 15/00; A61H 2201/0138; A61H 2205/00; A61H 23/00
See application file for complete search history.

(56) References Cited

U.S. PATENT DOCUMENTS

| | | | | |
|---|---|---|---|---|
| 8,439,948 | B1 | 5/2013 | King et al. | |
| 8,672,971 | B2 | 3/2014 | Kellner | |
| 9,615,986 | B2 | 4/2017 | Santinelli Ramos | |
| 2010/0211099 | A1 * | 8/2010 | Radermacher | A61G 13/009 606/245 |
| 2018/0207043 | A1 * | 7/2018 | Silver | A61G 13/009 |
| 2022/0039764 | A1 * | 2/2022 | Oswald | A61G 13/0054 |

FOREIGN PATENT DOCUMENTS

| | | | | |
|---|---|---|---|---|
| CN | 101848692 A | * | 9/2010 | A61G 13/009 |

* cited by examiner

*Primary Examiner* — Kendra D Carter
*Assistant Examiner* — Arielle Wolff
(74) *Attorney, Agent, or Firm* — McKinney Law Group APC; Jeffrey A. J. Mckinney D.

(57) ABSTRACT

The present invention is generally directed to a table that is used in the treatment and manipulation of joints and related methods. It is more specifically directed to a table having portions that can move in various directions relative to one another for the treatment and manipulation of joints and related methods. In one aspect, the present invention provides a table used in the treatment and manipulation of a patient's joints. The table typically comprises a base, a head and neck portion, a chest portion, a pelvic portion, and a knee and foot portion.

2 Claims, 7 Drawing Sheets

ADJUSTABLE TABLE AND RELATED METHODS

This application claims priority benefit of U.S. Provisional Patent Application No. 63/205,462, filed Dec. 11, 2020. The entire content of this application is hereby incorporated by reference herein in its entirety.

FIELD OF THE INVENTION

The present invention is generally directed to a table that is used in the treatment and manipulation of joints and related methods. It is more specifically directed to a table having portions that can move in various directions relative to one another for the treatment and manipulation of joints and related methods.

BACKGROUND OF THE INVENTION

There have been reports of tables used for chiropractic treatment. U.S. Pat. No. 9,615,986, entitled "Chiropractic Table", for instance, allegedly reports the following: "Chiropractic table that allows conservation of the natural curves of the spine of a patient using thereof, comprising a continuous curved surface having a concave section at its central portion on the convex side of said curved surface defining first and second convex sections, wherein the ends of the curved surface are in contact with the ends of a frame composed of a plurality of longitudinal straight bar pairs, parallel to each other and which are transversely joined by a plurality of main transverse bars to said longitudinal straight bars, wherein further the first convex section has a greater height then the second convex section with respect to the plane defined by the plurality of longitudinal straight bars and the plurality of main transverse bars." Abstract.

U.S. Pat. No. 8,672,971, entitled "Chiropractic table apparatus and method of use", allegedly discusses the following: "A chiropractic table has a base, a table support member connected to the base and extending upward from the base, an axial-lateral-tilt mechanism laterally connected to table support member, a cephalad section connected transversely to and being supported by the table support member above the base, a head section connected to and extending longitudinally from a first cephalad section end of the cephalad section, and a caudal section interconnected with the axial-lateral-tilt mechanism and the table support member and being positioned longitudinally adjacent a second cephalad section end of the cephalad section where the axial-lateral-tilt mechanism has an axial pivot mechanism configured to axially swing the caudal section along a predefined arc, the arc coinciding with a predefined radial distance from a pivot axis that is parallel to a longitudinal axis of the chiropractic table and located a predefined distance above a top surface of the chiropractic table." Abstract.

U.S. Pat. No. 8,439,948, entitled "Chiropractic table system", allegedly describes the following: "A chiropractic table system for providing effective treatment of sacroiliac joint pain in a patient. The chiropractic table system generally includes a table with an upper opening, a first support member extending through the upper opening and a second support member extending through the upper opening. The support members engage the hip portion of a patient lying upon the table. The support members are separated thereby separating the sacroiliac joints, then the support members are counter-pivoted with respect to one another thereby torquing the hip portion of the patient and then the support members are quickly lowered a distance to set the hip portion of the patient as desired." Abstract.

Despite the reports, there is still a need for new tables and related methods used in the treatment and manipulation of joints.

SUMMARY OF THE INVENTION

Figure 1:
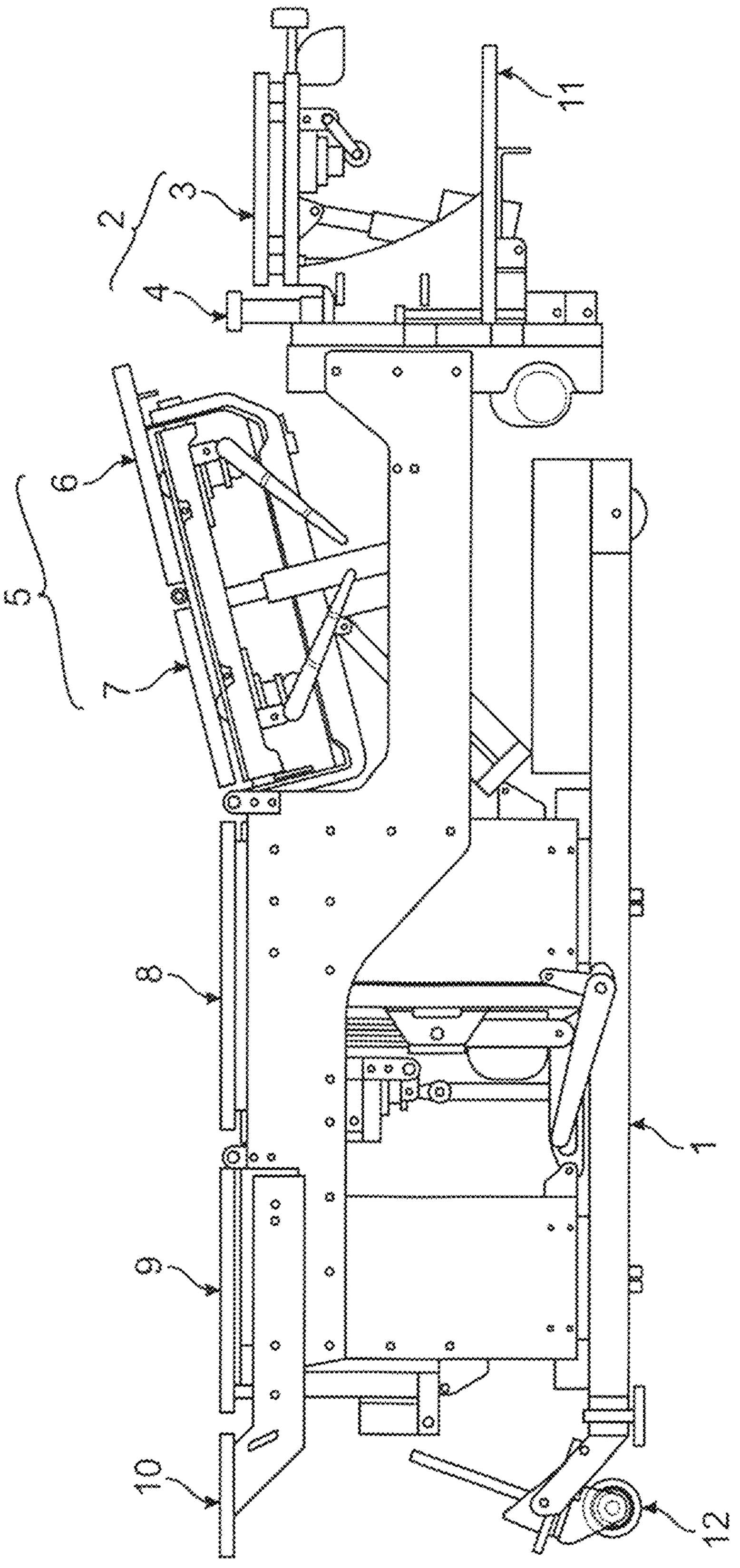
FIG. 1 shows a side view of one embodiment of a table according to the present invention. One end of the Chest Piece for spinal adjustment is elevated.

In one aspect, the present invention provides a table used in the treatment and manipulation of a patient's joints. The table comprises a base, to which is attached: a head and neck portion that includes two parts, one part including two roughly rectangular, relatively flat pieces for the support and manipulation of the patient's head and the other piece being a roughly rectangular, relatively flat piece for the support and manipulation of the patient's neck, wherein the piece for the support and manipulation of a patient's head is moveable along the z-axis and the support and manipulation for the patient's neck is independently moveable along the z-axis and rotatable around the y-axis in one-degree increments; a chest portion that includes three relatively flat pieces for the support and manipulation of the patient's torso, where two of the pieces are for the support and manipulation of the patient's upper torso and one piece is for support and manipulation of the patient's lower torso, and wherein the chest portion is moveable along the z-axis and rotatable around the x-axis in one-degree increments; a pelvic portion that includes one roughly rectangular, flat piece for the support and manipulation of the patient's torso, where the pelvic portion is moveable along the z-axis; a knee and foot portion that includes two roughly rectangular, flat pieces for the support and manipulation of the patients knees and feet, where the knee and foot portion are moveable together around the x-axis.

In another aspect, the present invention provides a method of treating a patient involving the table of the preceding paragraph. The method involves use of a table according to claim 1, and wherein the method comprises the steps of: placing a patient on the table; manipulating the patient's head and neck by movement of the piece for the support and manipulation of patient's head along the z-axis, movement of the piece for the support and manipulation of the patient's neck along the z-axis, and rotation of the piece for the support and manipulation of the patient's neck around the y-axis; manipulating the patient's torso by moving the chest portion along the z-axis and rotating it around the x-axis; manipulating the patient's pelvis by moving the pelvic portion along the z-axis; and, manipulating the patient's knees and feet by moving the knee and foot portion around the x-axis thereby treating the patient.

DETAILED DESCRIPTION OF THE INVENTION

The present invention is generally directed to a table that is used in the treatment and manipulation of joints and related methods. It is more specifically directed to a table having portions that can move in various directions relative to one another for the treatment and manipulation of joints and related methods.

As shown from the figures, an embodiment of the table of the present invention includes several parts. There is a base (1) to which is attached: a Head and Neck portion (2), which includes one independently moving surface labeled Z Axis Translation (3) in the figures and a second independently moving part labeled Cervical X Axis Fulcrum (4); a Chest Spinal Adjustment (5) portion, which is movable out of the table plane in at least two ways, IN Y-Axis Rotation (6) and 3D XYZ Axis (7); a Pelvic Piece (8) that can be raised and lowered relative to the table plane; a Knee Rest (9) and Foot Rest (10), where one end can be elevated relative to the table plane; a Hand Rest (11); a Castor Portable Mobility System (12); and, an American Disabilities Act Elevation Adjustment (13).

Figure 3:
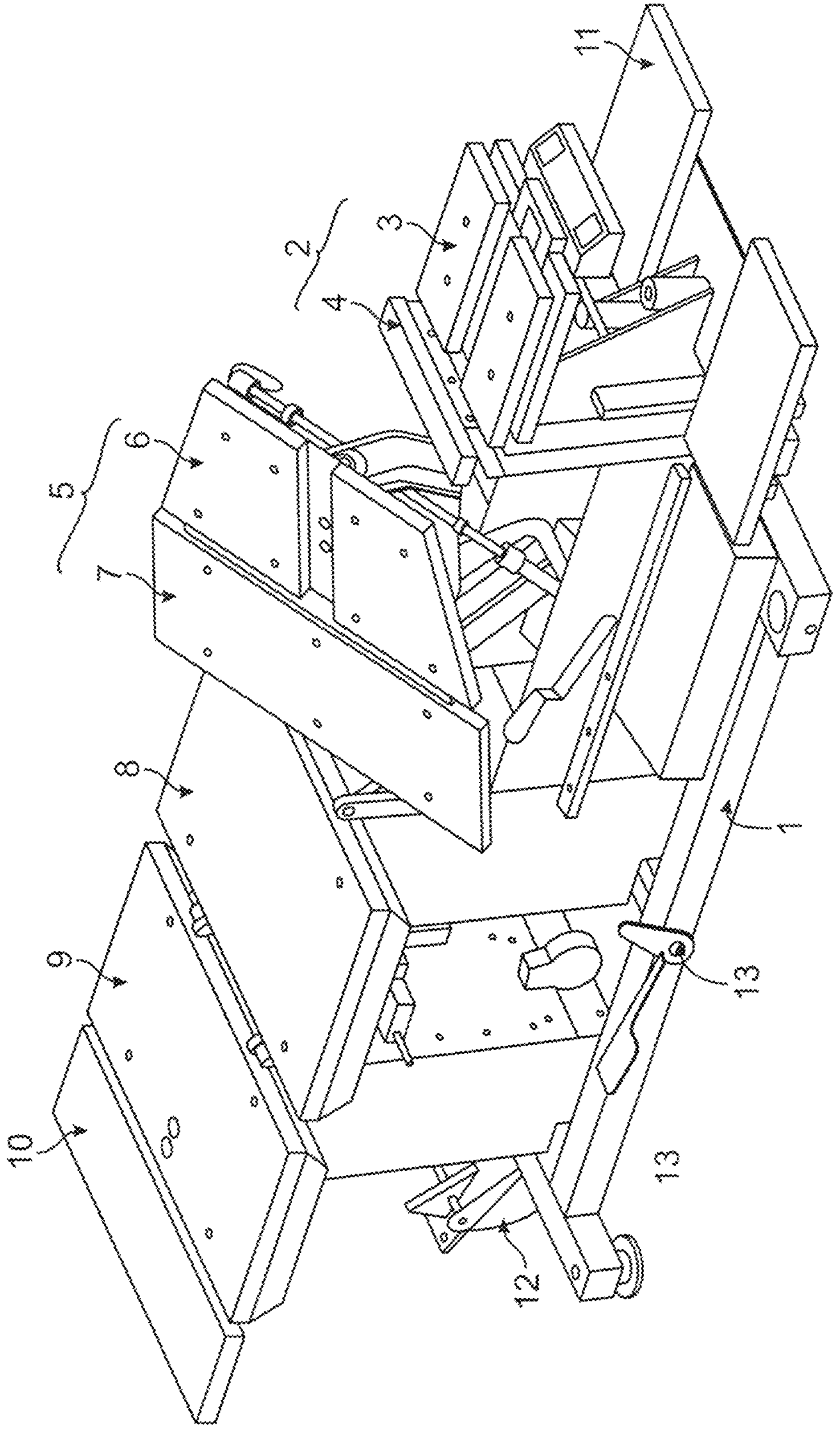
FIG. 3 shows a top view of one embodiment of a table according to the present invention. The Chest Piece is elevated at one end and is further rotated out of the table plane.

For ease of discussion, three axes relative to the table of the present invention are defined. When none of the table parts are elevated or rotated, a relatively flat surface, defining the table top is presented. The relatively flat surface is defined as an x-y plane. The y-axis is defined as a line running from the Foot Rest portion of the table to the Head and Neck portion at the table mid-point (i.e., the point halfway in between one side of the Foot Rest, proximal to one viewing FIG. 3, to the other side of the Foot Rest, distal to the viewer) or directly above the table midpoint. The x-axis is defined as a line lying in the x-y plane that runs perpendicular to the y-axis that is in the x-y plane or above it. The z-axis is defined as a line that runs perpendicular to the x-y plane and which runs through the y-axis. The y-z plane is perpendicular to the x-y plane and runs through the y-axis.

When discussing the rotation of parts or portions of the table around a particular axis, the following is meant: A rotation around the y-axis is at zero degrees when the part is coplanar with the x-y plane or parallel to the x-y plane. A rotation greater or less than zero degrees means that the part has been rotated around the y-axis such that it has a portion that is on one side of the x-y plane and a second portion that is on the other side of the x-y plane. For instance, if one were to place a circle perpendicular to the x-y plane with the y-axis running through the center of the circle, a five degree rotation would involve rotating the part such that one side has moved five degrees along the circle (out of 360 degrees) and the other side has moved five degrees along the circle in the other direction. In other words, the movement of one side would be described as a plus five degree movement while the movement of the other side would be described as a minus five degree movement.

A rotation around the x-axis is at zero degrees when the part is coplanar with the x-y plane. A rotation greater or less than zero degrees means that the part has been rotated around the x-axis such that it has a portion that is on one side of the x-y plane and a second portion that is on the other side of the x-y plane. For instance, if one were to place a circle perpendicular to the x-y plane with the x-axis running through the center of the circle, a five degree rotation would involve rotating the part such that one side has moved five degrees along the circle (out of 360 degrees) and the other side has moved five degrees along the circle in the other direction. As with y-axis rotation, the movement of one side would be described as a plus five degree movement while the movement of the other side would be described as a minus five degree movement.

Movement along the z-axis typically involves the movement of a part perpendicular to the x-y plane of the table. For instance, elevating a part where the surface of the part remains relatively parallel to the table x-y plane, would be movement along the z-axis.

Figure 6:
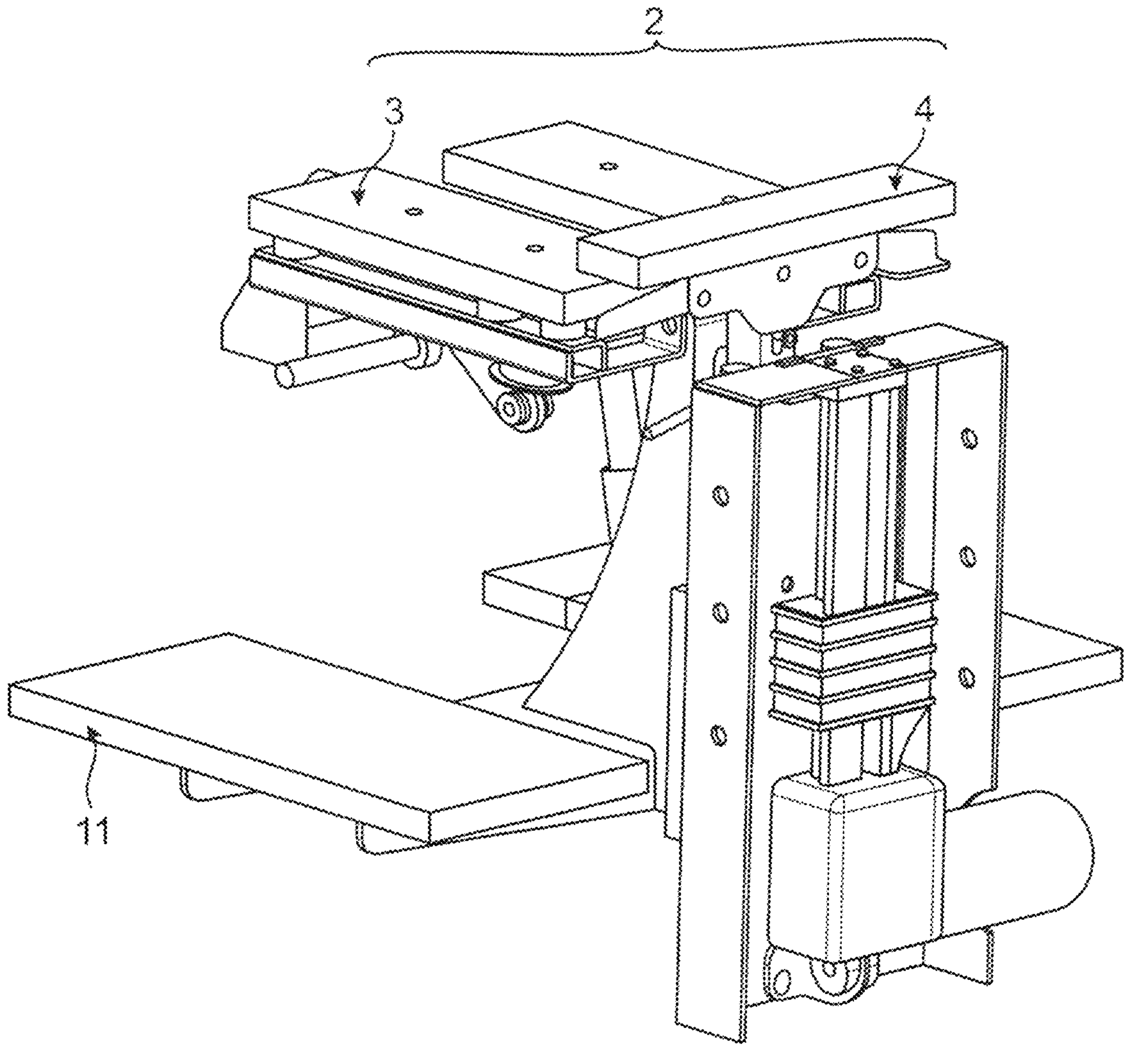
FIG. 6 shows a side view of the Head and Neck portion of one embodiment of a table according to the present invention.
Figure 7:
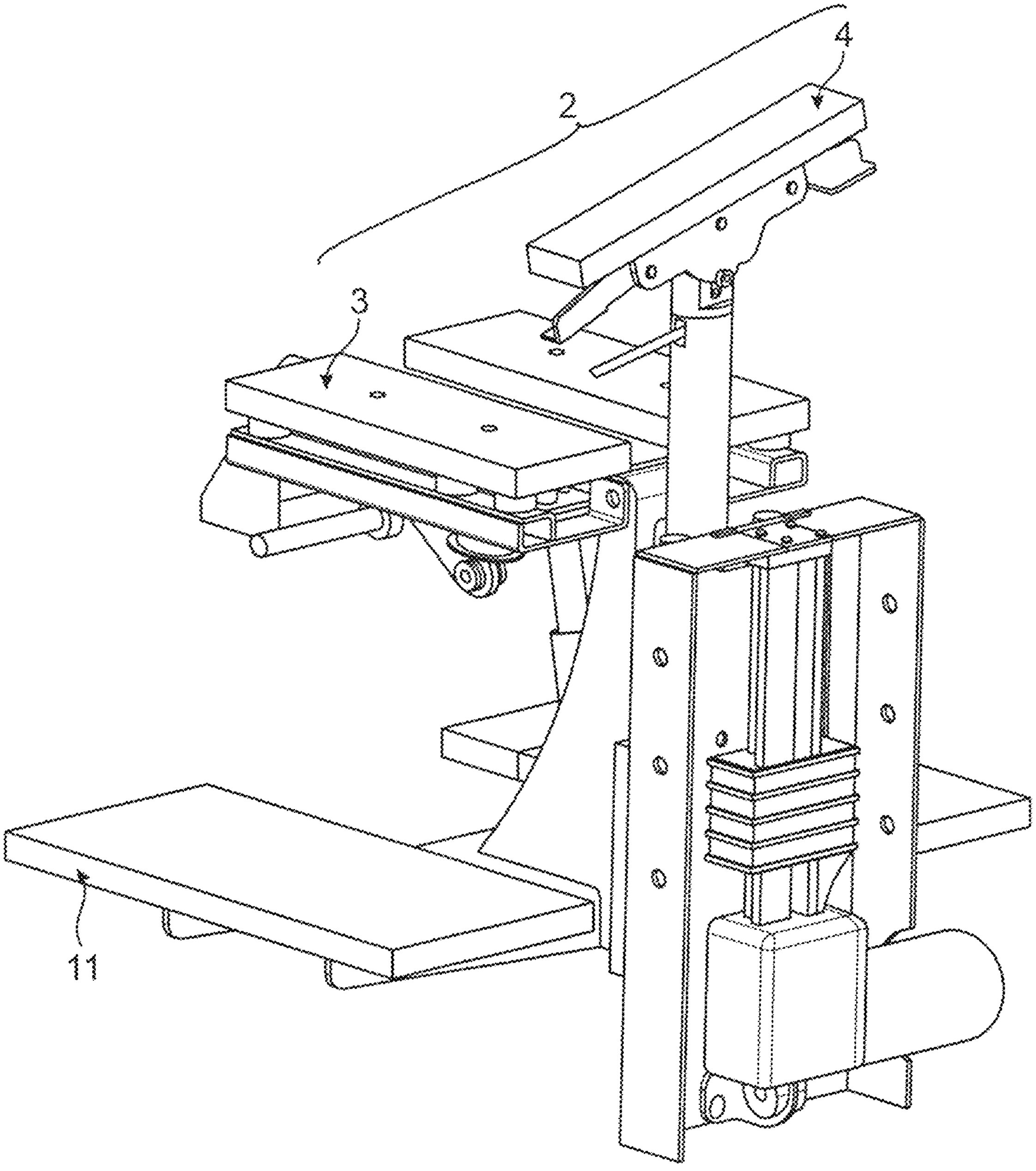
FIG. 7 shows a side view of the head and neck portion of one embodiment of a table according to the present invention where the Cervical X Axis Fulcrum is rotated out of the table plane.

Referring to the various figures, the Head and Neck portion of the table of the present invention includes a part where a patient receiving treatment can place her head. As shown in FIG. 6, for example, the head placement part includes two relatively flat surface pieces with a space lying in between them. The portion for head placement can be elevated along the z-axis. The Head and Neck portion further includes a part labeled as Cervical X Axis Fulcrum, where a patient's neck is typically placed. The Cervical X Axis Fulcrum, as shown in FIG. 7, for example, is a part that is roughly rectangular with a relatively flat surface. Also as shown in FIG. 7, it is moveable along the z-axis and rotatable around the y-axis. The rotation around the y-axis can occur in one-degree movements, e.g., plus or minus 1, 2, 3, 4, 5, 6, 7, 8, 9, 10, 11, 12, 13, 14, 15, 16, 17, 18, 19 or 20 degrees.

Figure 2:
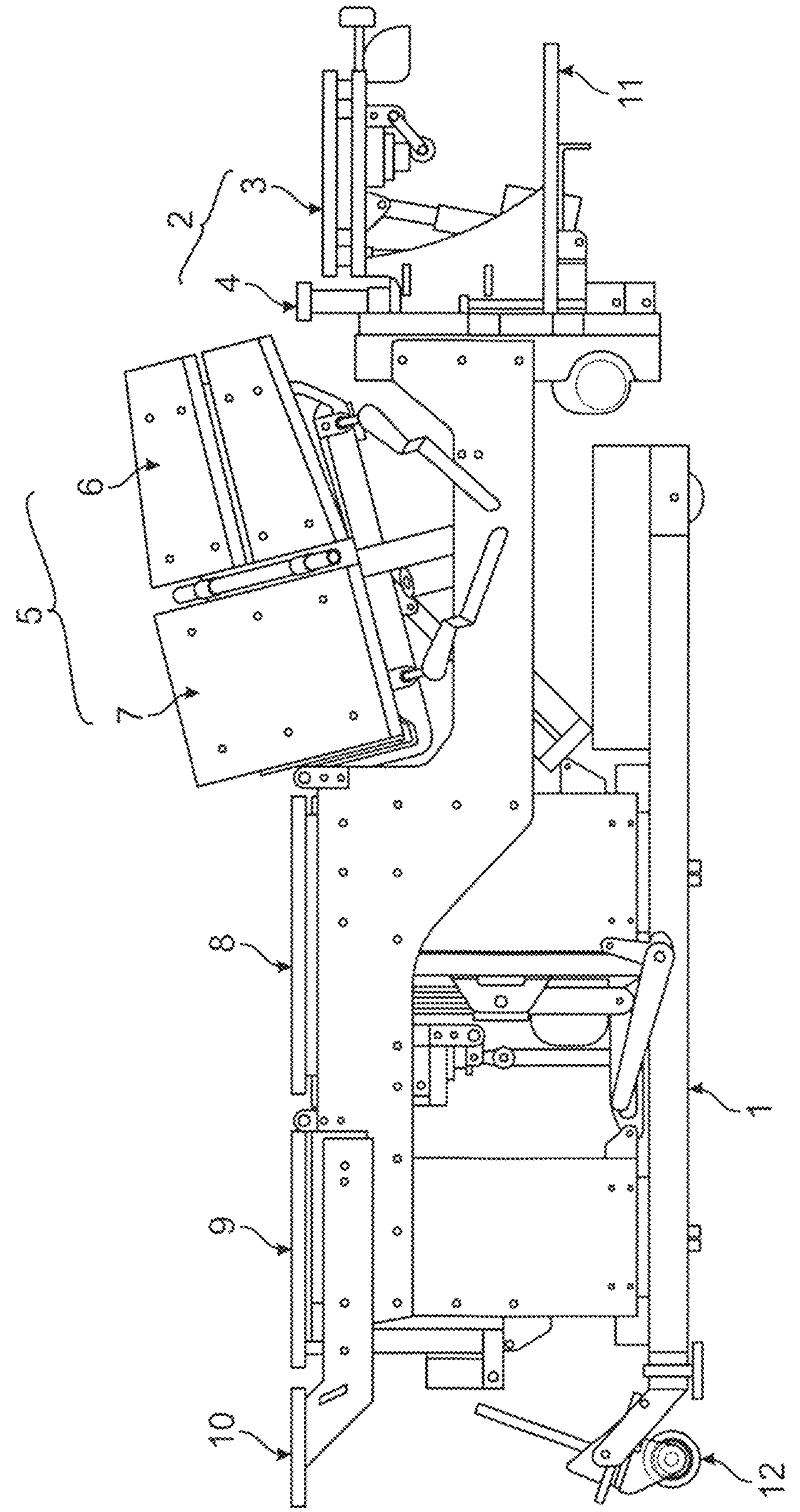
FIG. 2 shows a side view of one embodiment of a table according to the present invention. The Chest Piece is elevated at one end and is further rotated out of the table plane (i.e., the plane made by the surface of the table when none of its parts are elevated or rotated).

The Chest Spinal Adjustment portion of the table of the present invention is a part where a patient typically places her torso. As shown, for example, in FIG. 2, the part has three relatively flat surface pieces, two that are similarly shaped that will support the upper portion of a patient's torso and one that will support the lower portion of a patient's torso. The Chest Spinal Adjustment is rotatable along the x-axis (FIG. 1) and is moveable along the z-axis. The rotation around the x-axis can occur in one-degree movements, e.g., plus or minus 1, 2, 3, 4, 5, 6, 7, 8, 9, 10, 11, 12, 13, 14, 15, 16, 17, 18, 19 or 20 degrees.

Figure 4:
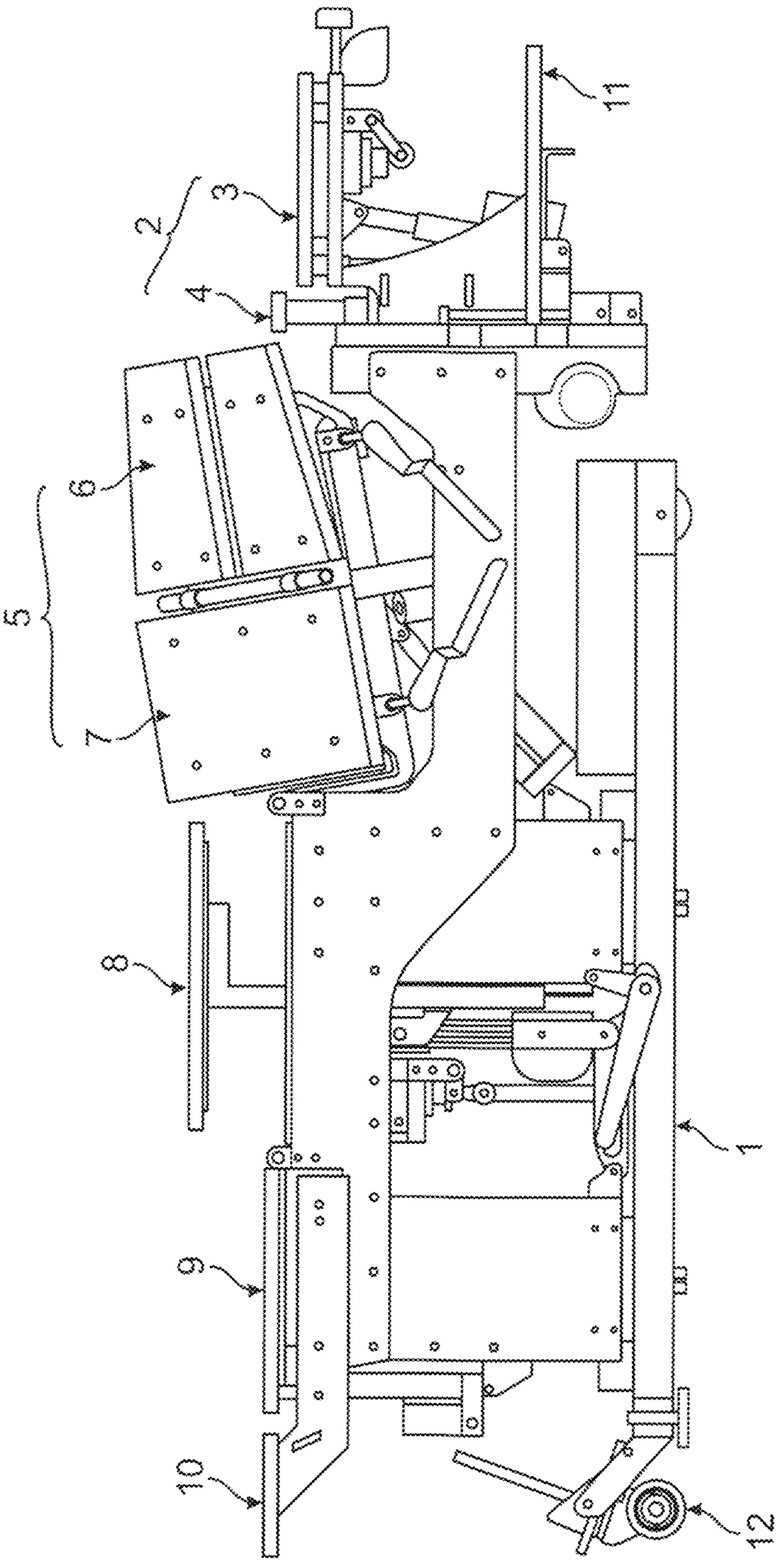
FIG. 4 shows a side view of one embodiment of a table according to the present invention. The Chest Piece is elevated at one end and is further rotated out of the table plane. The Pelvic Piece is elevated relative to the table plane.

The Pelvic Piece portion of the table of the present invention is a part where a patient typically places her pelvis. As shown, for example, in FIG. 3. The part is a roughly rectangular and relatively flat surface piece. The Pelvic Piece is moveable along the z-axis (see FIG. 4).

Figure 5:
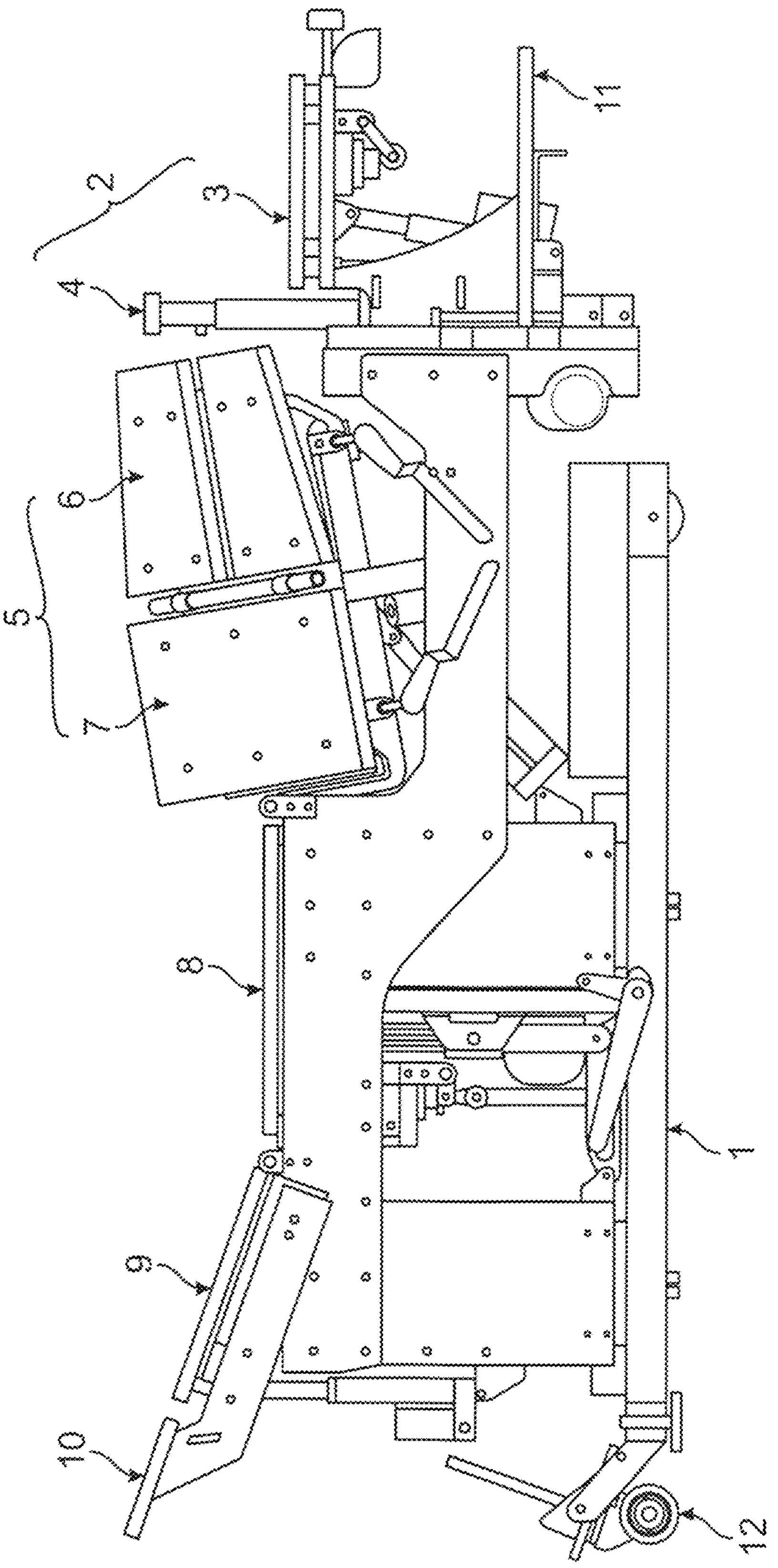
FIG. 5 shows a side view of one embodiment of a table according to the present invention. The Chest Piece is elevated at one end and is further rotated out of the table plane. The Knee Rest and Foot Rest are elevated at one end, with the end proximal to the Chest Piece remaining at table plane height. The Cervical X Axis Fulcrum is also elevated relative to the table plane.

The Knee Rest and Foot Rest portion of the table of the present invention includes two pieces, as shown. Both pieces are roughly rectangular and relatively flat. As shown in FIG. 5, the two pieces can move together, rotating around the x-axis such that the Foot Rest piece is elevated relative to the Knee Rest piece.

The invention claimed is:

1. A table used in treatment and manipulation of a patient's joints, wherein the table comprises a base, to which is attached:

a head and neck portion that includes two parts, one part including two roughly rectangular, relatively flat pieces for support and manipulation of a patient's head and a second part being a roughly rectangular, relatively flat piece for support and manipulation of a patient's neck, wherein the one part for the support and manipulation of the patient's head is moveable along a z-axis and the second part for the support and manipulation for the patient's neck is independently moveable along the z-axis and rotatable around a y-axis in one-degree increments to plus or minus 20 degrees;

a chest portion that includes three relatively flat pieces for support and manipulation of a patient's torso, where two of the three relatively flat pieces are for support and manipulation of a patient's upper torso and one of the three relatively flat pieces is for support and manipulation of a patient's lower torso, and wherein the chest portion is moveable along the z-axis and rotatable around a x-axis and y-axis in one-degree increments to plus or minus 20 degrees;

a pelvic portion that includes one roughly rectangular, flat piece for the support and manipulation of a patient's pelvis, where the pelvic portion is moveable along the z-axis;

a knee and foot portion that includes two roughly rectangular, flat pieces for support and manipulation of the patients knees and feet, where the two roughly rectangular, flat pieces of the knee and foot portion are moveable together around the x-axis.

2. A method of treating a patient, wherein the method involves use of the table according to claim 1, and wherein the method comprises the steps of:

placing the patient on the table;

manipulating the patient's head and neck by movement of the two roughly rectangular, relatively flat pieces for the support and manipulation of the patient's head along the z-axis, movement of the roughly rectangular, relatively flat piece for the support and manipulation of the patient's neck along the z-axis, and rotation of the piece for the support and manipulation of the patient's neck around the y-axis;

manipulating the patient's torso by moving the chest portion along the z-axis and rotating the chest portion around the x-axis and y-axis;

manipulating the patient's pelvis by moving the pelvic portion along the z-axis; and, manipulating the patient's knees and feet by moving the knee and foot portion around the x-axis thereby treating the patient.

* * * * *